Oct. 30, 1923.
C. O. JOHNSON ET AL
1,472,220
MILK CAN COVER
Filed July 14, 1922
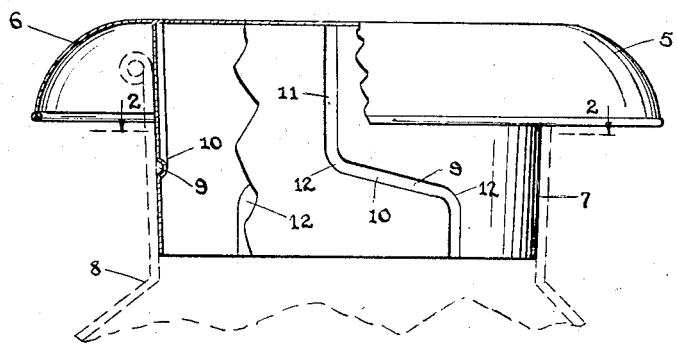
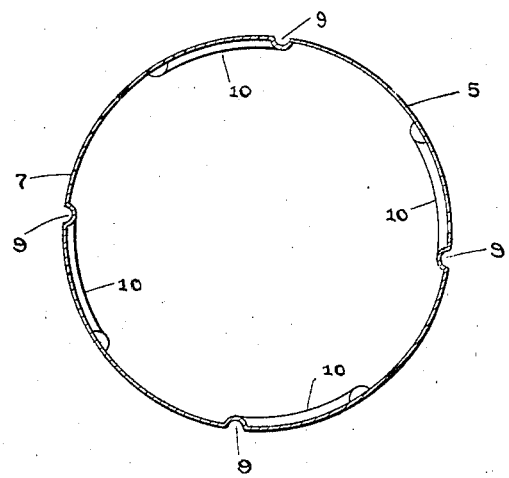
INVENTOR.
Carl O. Johnson
BY August F. Bergholz
Morsell & Keeney
ATTORNEYS.

Patented Oct. 30, 1923.

1,472,220

UNITED STATES PATENT OFFICE.

CARL O. JOHNSON AND AUGUST F. BERGHOLZ, OF JEFFERSON, WISCONSIN.

MILK-CAN COVER.

Application filed July 14, 1922. Serial No. 574,946.

*To all whom it may concern:*

Be it known that we, CARL O. JOHNSON and AUGUST F. BERGHOLZ, citizens of the United States, and residents of Jefferson, in the county of Jefferson and State of Wisconsin, have invented new and useful Improvements in Milk-Can Covers, of which the following is a description, reference being had to the accompanying drawings, which are a part of this specification.

This invention relates to improvements in milk can covers.

Milk cans and covers as now ordinarily constructed are not provided with means for venting the cans, with the result that when filled with milk which has not yet lost its animal heat, the closed cans will cause said milk to quickly spoil. Furthermore, milk cans which have not been thoroughly cleaned will soon generate a very disagreeable odor if covered with an air tight cover.

It is one of the objects of the present invention to overcome the above mentioned objectionable features and provide a milk can cover constructed to continuously vent the interior of the can so that warm milk placed within the can will be permitted to cool without spoiling and will be kept in a more sanitary condition.

A further object of the invention is to provide a milk can cover constructed to continuously vent the can without permitting the escape of the milk through the vent openings due to being splashed during transportion.

A further object of the invention is to provide a milk can cover which is of simple construction, is strong and durable and is well adapted for the purpose described.

With the above and other objects in view the invention consists of the improved milk can cover and its parts and combinations as set forth in the claims and all equivalents thereof.

In the accompanying drawing in which the same reference characters indicate the same parts in all of the views:

Fig. 1 is a side view of the improved milk can cover, parts broken away to show interior construction; and Fig. 2 is a horizontal sectional view thereof taken on line 2—2 of Fig. 1.

Referring to the drawing, the numeral 5 indicates a milk can cover which comprises the cap portion 6 of round formation and the circular downwardly extending neck or flange portion 7 which is connected thereto and is adapted to tightly fit into the opening of the milk can 8 to close the same. The said neck portion is slightly tapered as shown in Fig. 1 to more closely fit the can and to compensate for wear.

The neck portion is formed with a plurality of downwardly extending grooves 9 which are formed by embossing portions of the can inwardly. Said grooves extend from the upper to the lower edges of the neck portion so that when the neck portion is inserted into the can, the grooves in conjunction with the can will form air vents or passageways leading from the interior of the can to the atmosphere thus permitting the free escape of heat or odors from the milk contained within the can and maintain the can and its contents in a sanitary condition.

In order to prevent the splashing of the milk from working up the grooves during transportation and handling of the cans, the said grooves extend vertically upwardly for a short distance from the lower edge of the cover neck, and then turn approximately at right angles to a slightly inclined position as indicated by the numeral 10. From the upper ends of the slightly inclined portions the grooves join vertically extending portions 11 which extend to the upper portion of the cover, thus forming each groove in three sections, the vertical sections of which are offset with relation to each other and joined together by approximately a horizontal section. As thus constructed, the shoulders or turns 12 formed at the junction of the sections will prevent the splashing milk from working upwardly in the grooves and out of the can, without in any manner interfering with the passage of air therethrough. Furthermore, as the grooves are in the outer surface of the neck portion they can be easily cleaned and kept in a sanitary condition.

From the foregoing description it will be seen that the milk can cover is well adapted to maintain the milk in the cans and the cans in a sanitary condition.

What we claim as our invention is:

1. A milk can cover, consisting of a top portion having a neck part depending therefrom and provided with a vent groove in its outer surface formed of two vertically extending offset sections joined together by a third section, said sections extending from the lower to the upper portion of said neck.

2. A milk can cover, consisting of a top portion having a neck part depending therefrom and provided with a plurality of vent grooves in its outer surface which extend from the lower to the upper portion of said neck part, said vent grooves being formed of staggered sections joined together by approximately horizontally extending third sections.

3. In combination with a milk can having an opening, of a cover therefor, consisting of a top portion having a neck portion which extends into the can opening to form a closure, said neck portion provided with vent grooves which extend from the lower to the upper portions of the neck and formed of vertical staggered sections joined together by intermediate circumferential sections to open communication between the interior of the can and the atmosphere.

In testimony whereof, we affix our signatures.

CARL O. JOHNSON.
AUGUST F. BERGHOLZ.